United States Patent
Klukowski (10) Patent No.: US 7,350,859 B2
(45) Date of Patent: Apr. 1, 2008

(54) HEADREST FOR VEHICLE SEAT AND SEAT COMPRISING SUCH A HEADSET

(75) Inventor: Slawomir Klukowski, Paris (FR)

(73) Assignee: Faurecia, Sieges d'Automobile, Nanterre (FR)

( * ) Notice: Subject to any disclaimer, the term of this patent is extended or adjusted under 35 U.S.C. 154(b) by 0 days.

(21) Appl. No.: 11/538,556

(22) Filed: Oct. 4, 2006

(65) Prior Publication Data

US 2007/0075578 A1    Apr. 5, 2007

(30) Foreign Application Priority Data

Oct. 5, 2005 (FR) .................................. 05 10197
Sep. 18, 2006 (FR) .................................. 06 08162

(51) Int. Cl.
*A47C 7/36* (2006.01)
(52) U.S. Cl. ................................. 297/216.12
(58) Field of Classification Search ............ 297/216.12
See application file for complete search history.

(56) References Cited

U.S. PATENT DOCUMENTS

| | | |
|---|---|---|
| 6,082,817 A | 7/2000 | Mueller et al. |
| 6,688,697 B2 * | 2/2004 | Baumann et al. ... 297/216.12 X |
| 6,715,829 B2 * | 4/2004 | Svantesson et al. ... 297/216.12 |
| 7,073,856 B2 * | 7/2006 | Akaike et al. ......... 297/216.12 |
| 7,284,793 B2 * | 10/2007 | Kluhspies et al. ..... 297/216.12 |
| 2007/0241593 A1 * | 10/2007 | Woerner ................. 297/216.12 |
| 2007/0246989 A1 * | 10/2007 | Brockman ......... 297/216.12 X |

FOREIGN PATENT DOCUMENTS

| | | |
|---|---|---|
| DE | 19941712 | 10/2000 |
| DE | 10348939 | 1/2005 |
| EP | 1491394 | 12/2004 |
| JP | 2005087650 | 7/2005 |

OTHER PUBLICATIONS

French Preliminary Search Report FR0608162, dated Nov. 27, 2006.
French Preliminary Search Report FR0510197, dated Jun. 23, 2006.

* cited by examiner

*Primary Examiner*—Rodney B. White
(74) *Attorney, Agent, or Firm*—Frost Brown Todd LLC (57) ABSTRACT

Headrest (150) comprising a fixed part (111), a mobile part (112) opposite the fixed part, first (114) and second (115) connecting rods, each connecting rod comprising two branches, connecting the fixed part to the mobile part and two resilient devices acting on the first and second connecting rods to distance the mobile part from the fixed part. The first and second connecting rods respectively slide on the mobile and fixed parts and a third connecting rod (113) is provided to connect the fixed and mobile parts.

16 Claims, 6 Drawing Sheets

HEADREST FOR VEHICLE SEAT AND SEAT COMPRISING SUCH A HEADSET

The present invention relates to safety devices for a transit vehicle.

It relates more specifically to a headrest for a motor vehicle, comprising:
- a fixed part,
- a mobile part opposite the fixed part,
- at least first and second connecting rods, each connecting rod comprising at least two branches, connecting said fixed and mobile parts, said first and second connecting rods allowing the mobile part to be displaced from a normal position in the vicinity of the fixed part, to a protective position remote from the fixed part, the first connecting rod being pivotably mounted, by a first pivoting connection, on a first element selected from the fixed and mobile parts, and slidably mounted relative to a second element selected from said fixed and mobile parts,
- and a retaining device designed selectively to maintain the mobile part in the normal position or to release said mobile part.

This type of headrest is already known, in particular from document DE-A-103 48939. Headrests of this type allow the displacement of the mobile part of the headrest towards the head of the occupant of the seat in the event of rear impact on the vehicle, which allows injuries sustained to the head and neck of the passenger to be reduced.

The object of the present invention is, in particular, to improve headrests of this type, in particular to improve the stability of the mobile part in the protective position.

To this end, according to the invention, a headrest of the type under consideration is characterized:
- in that it further comprises a third connecting rod which connects said first and second elements to one another,
- in that the second connecting rod is pivotably mounted on the second element by a second pivoting connection and slidably mounted relative to the first element,
- and in that it further comprises first and second resilient devices acting respectively on the first and second connecting rods to urge said mobile part towards the protective position, said first and second resilient devices being pretensioned when the mobile part is in the normal position.

Due to these arrangements and, in particular, due to the presence of the third connecting rod, the stability of the mobile part in the protective position is improved.

In various embodiments of the invention, it may be possible, moreover, to resort to one and/or other of the following arrangements:
- the first and third connecting rods are connected to one another by the first pivoting connection, the first resilient device comprising at least one first helical spring mounted between said first and third connecting rods;
- the second and third connecting rods are connected to one another by the second pivoting connection, the second resilient device comprising at least one second helical spring mounted between said second and third connecting rods;
- each of the first and second elements has an upper part and a lower part, the first pivoting connection being provided in the upper part of the first element and the second pivoting connection being provided in the lower part of the second element;
- the first and second connecting rods comprise toothed sections; the third connecting rod carries at least one toothed pinion engaging with said toothed sections;
- the toothed pinion is freely rotatably mounted on a central part of the third connecting rod;
- the first connecting rod comprises a first pivot capable of sliding in a first slot provided on said second element, between a first position corresponding to the normal position of said mobile part, and a second position corresponding to the protective position;
- the second connecting rod comprises a second pivot capable of sliding in a second slot provided on the first element, between a first position corresponding to the normal position of said mobile part, and a second position corresponding to the protective position;
- the first slot comprises a first portion, in which the first pivot is located when it is in the first position and a second portion in which the first pivot is located when it is in the second position; the second slot comprises a first portion, in which the second pivot is located when it is in the first position, and a second portion in which the second pivot is located when it is in the second position, the second portion of each of the first and second slots extending in a different direction from the first portion of the same slot, said portion being arranged to facilitate a displacement of the mobile part from the normal position towards the protective position;
- the second portion of each of the first and second slots is substantially rectilinear and the first portion of the same slot is inclined relative to said second portion towards the other slot;
- the first portion of each of the first and second slots is curved inwards;
- the first element is the fixed part and the second element is the mobile part;
- the first and second connecting rods, as well as the first and second slots, are designed so that a thrust exerted on the mobile part does not allow said mobile part to leave the protective position;
- at least the second slot is provided so that the second pivot is in abutment when the second connecting rod is in the second position, and so that the second connecting rod passes, between its first and second positions, into an intermediate position where a direction defined by the second pivoting connection and the second pivot is substantially perpendicular to the second slot;
- the second slot has a substantially rectilinear shape.

Furthermore, the subject of the invention is also a vehicle seat comprising a backrest carrying at least one headrest as defined above.

Further features, objects and advantages of the invention will appear from reading the following description of two of its embodiments. The invention will also be better understood by means of the drawings, in which.

Figure 1:
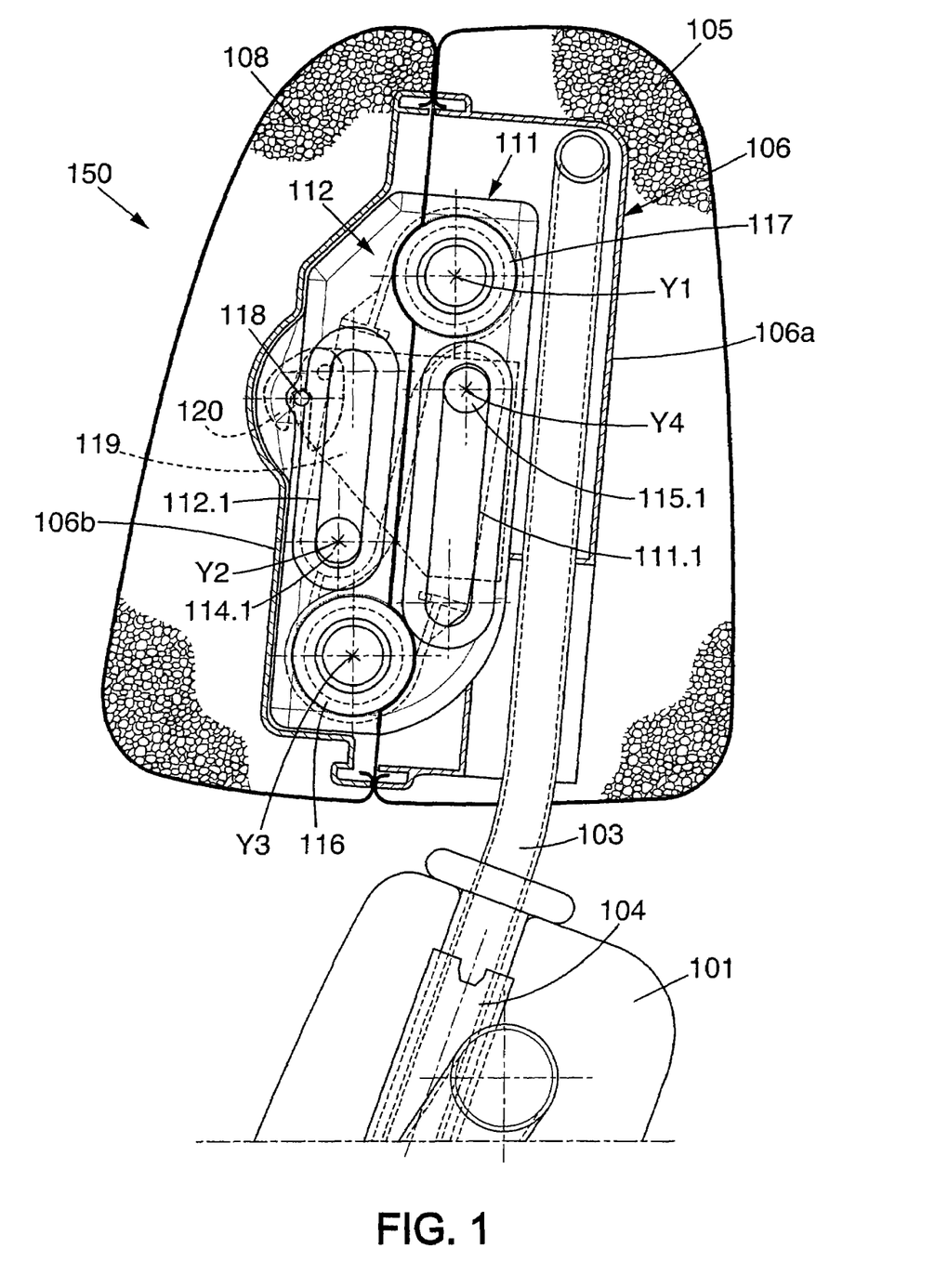
FIG. 1 is a view in vertical section of a headrest according to a first embodiment of the invention, in the normal position.

FIG. 1 shows a view in vertical section of the upper part of a motor vehicle seat provided with a headrest 150 according to a first embodiment of the invention. The headrest comprises a fixed part 111 and a mobile part 112 able to be displaced between a normal position in the vicinity of the fixed part 111, the position visible in FIG. 1, and a safety position remote from the normal position and visible in FIG. 3. The displacement is carried out in an emergency situation, in particular when the vehicle is subjected to a rear impact, to ensure increased safety for the occupant of the seat.

As shown in FIG. 1, the headrest 150 may comprise, for example, a rigid internal housing 106, made, for example, from plastic or the like, which contains the aforementioned fixed and mobile parts 111, 112. This housing 106 may comprise, for example, a rear shell 106a attached to the fixed part 111 and a front shell 106b attached to the mobile part 112.

The rear shell 106a may be carried by two rods 103 extending substantially vertically. These rods 103 are slidably mounted, respectively, in two support sleeves 104, known per se, which are fixed to the framework of the backrest 101 of a vehicle seat.

The rear shell 106a may, furthermore, be covered towards the rear by padding 105. Said rear shell 106a, the fixed part 111 and the padding 105 thus form together a fixed base which remains attached to the backrest 101 of the seat when the deployment mechanism is actuated.

The front shell 106b may, furthermore, be covered towards the front by padding 108 intended to serve as support for the head of a user seated on the seat. Said front shell 106b, the mobile part 112 and the padding 108 thus form a mobile assembly which is displaced towards the front when the deployment mechanism is actuated.

It will be noted that the housing 106 could possibly be omitted, possibly by modifying the shape of the fixed 111 and mobile 112 parts. In this case, the fixed part 111 could be fixed directly to the rods 103 and directly carry the padding 105, whilst the mobile part 112 would directly carry the padding 108.

Figure 2:
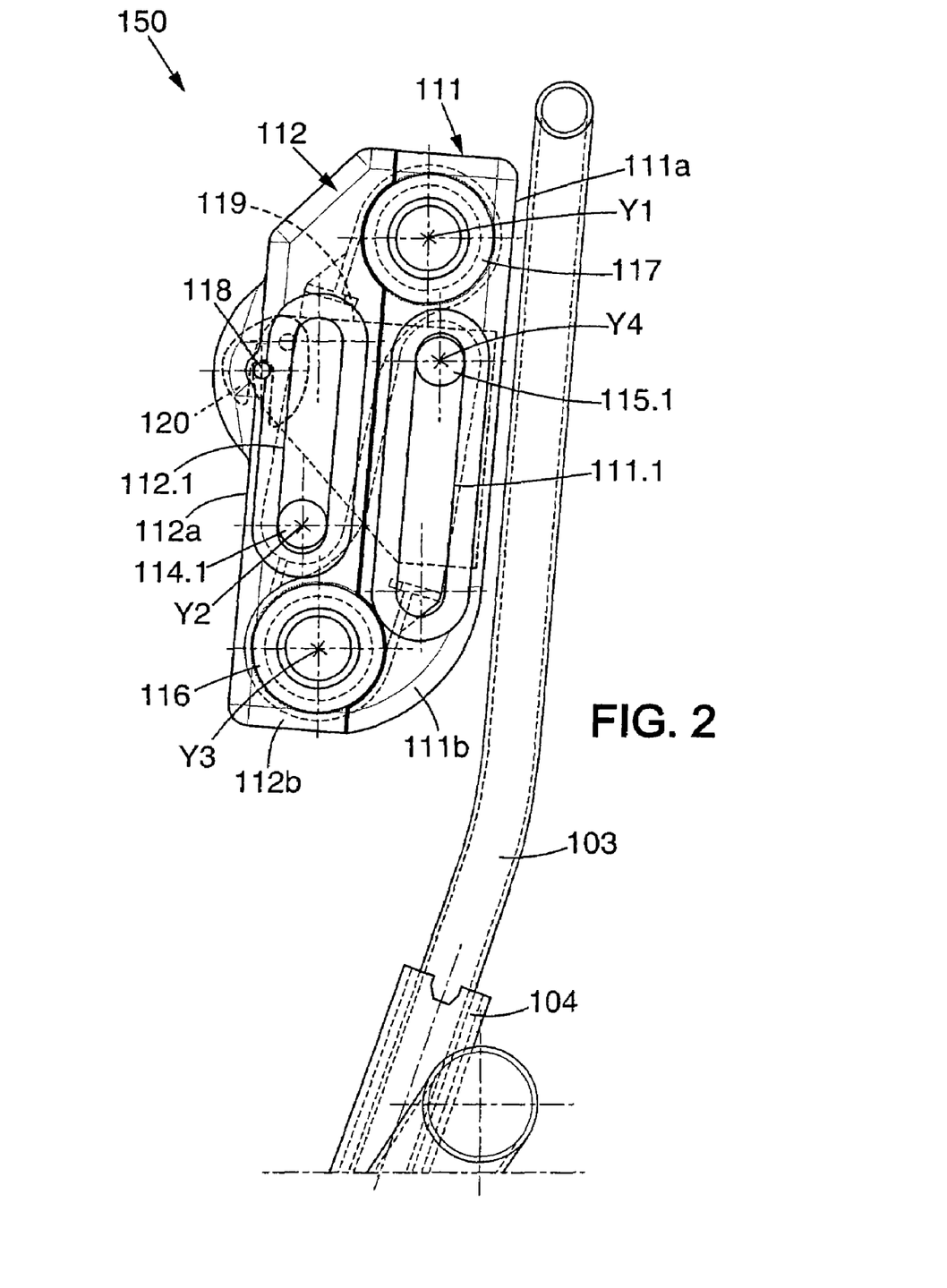
FIG. 2 is a view similar to FIG. 1, showing only the structure of the headrest.

As shown in more detail in FIGS. 2 to 6, the fixed 111 and mobile 112 parts may possibly be in the shape of two rigid shells, for example made from plastic, which form together a hollow housing in the normal position (FIG. 2).

Thus, the fixed part 111 may comprise, for example, a rear base 111a and a peripheral edge 111b which is open towards the front, whilst the mobile part 112 may comprise a front base 112a and a peripheral edge 112b which is open towards the rear and which is substantially connected to the peripheral edge 111b in the normal position. Moreover, the headrest also comprises a retaining device designed to maintain the mobile part 112 in its normal position and to release this mobile part in the event of an emergency. This retaining device may comprise, for example, an electromagnet mechanism 119 connected, for example, to an external control circuit mounted inside the fixed part 111. This electromagnet mechanism 119 controls a hook 120 which, in the normal position, is engaged, for example, on a rigid rod 118 fixed to the inside of the mobile part 112.

The deployment mechanism which connects the fixed part 111 to the mobile part 112 may also be arranged inside the housing formed by said fixed and mobile parts.

This deployment mechanism may comprise, for example, three rigid connecting rods 114, 115, 113, made for example from plastic.

The first connecting rod 114 may comprise two parallel and symmetrical branches 114a, 114b, each extending in the vicinity of one of the vertical sides of the aforementioned peripheral edges 111b, 112b between:

a first end pivotably mounted about a transverse horizontal axis Y1, on the upper part of the fixed part 111, by a first pivoting connection 117 such as a shaft passing through the two branches 114a, 114b of the connecting rod 114 and fixed in the two opposing vertical sides of the peripheral edge 111b of the fixed part, and a second end comprising a first pivot 114.1, formed by a pin mounted both pivotably and slidably in a first rectilinear slot 112.1 made in the upper part of the vertical side corresponding to the peripheral edge 112b of the mobile part 112, the first pivot able to turn about an axis Y2 parallel to Y1. The first pivot slides in the slot 112.1 between first and second extreme positions, corresponding respectively to the normal and protective positions of the mobile part 112.

Figures 4, 5:
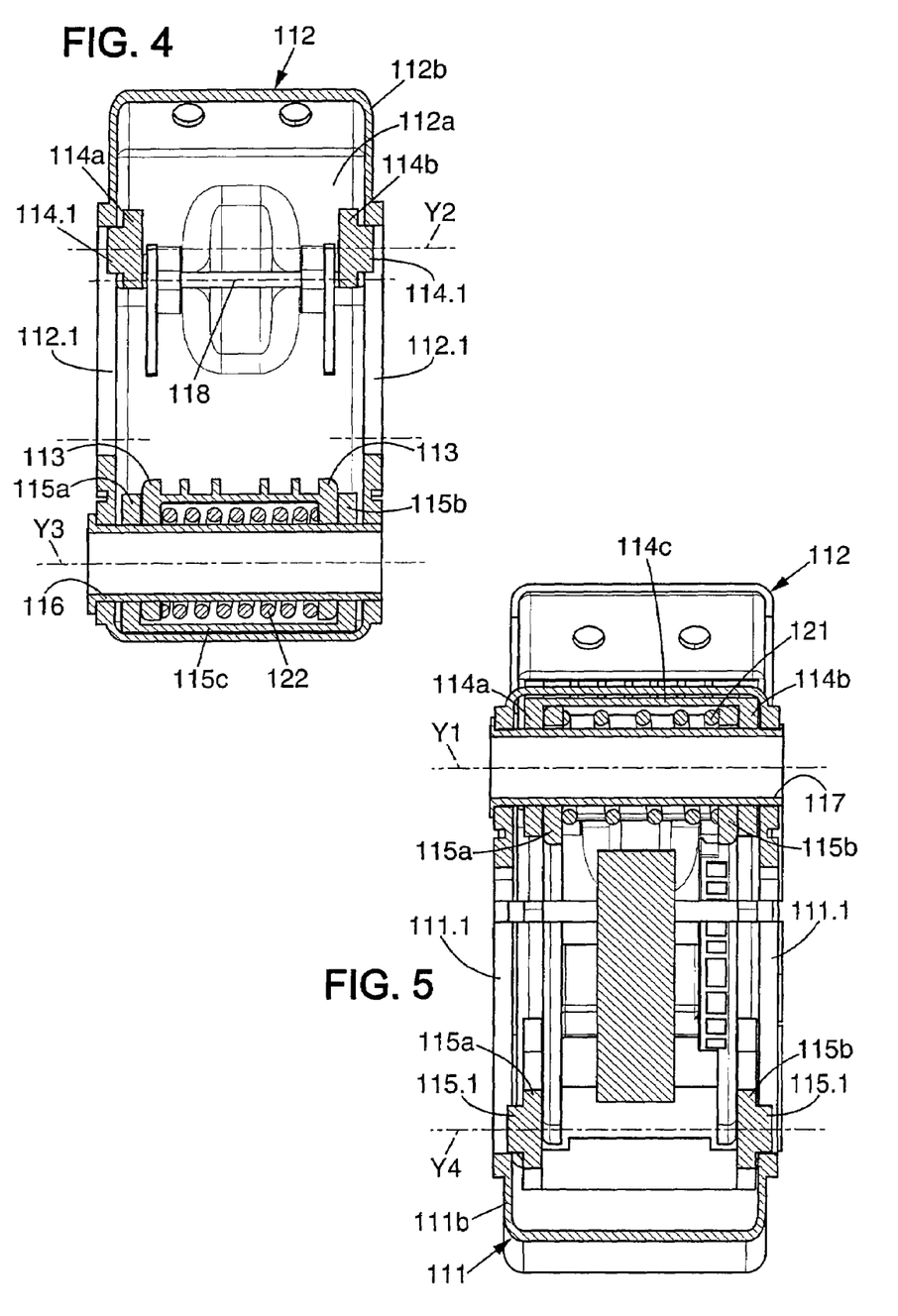
FIGS. 4 and 5 are sectional views according to the sectional planes IV-IV and V-V of FIG. 3.
Figure 6:
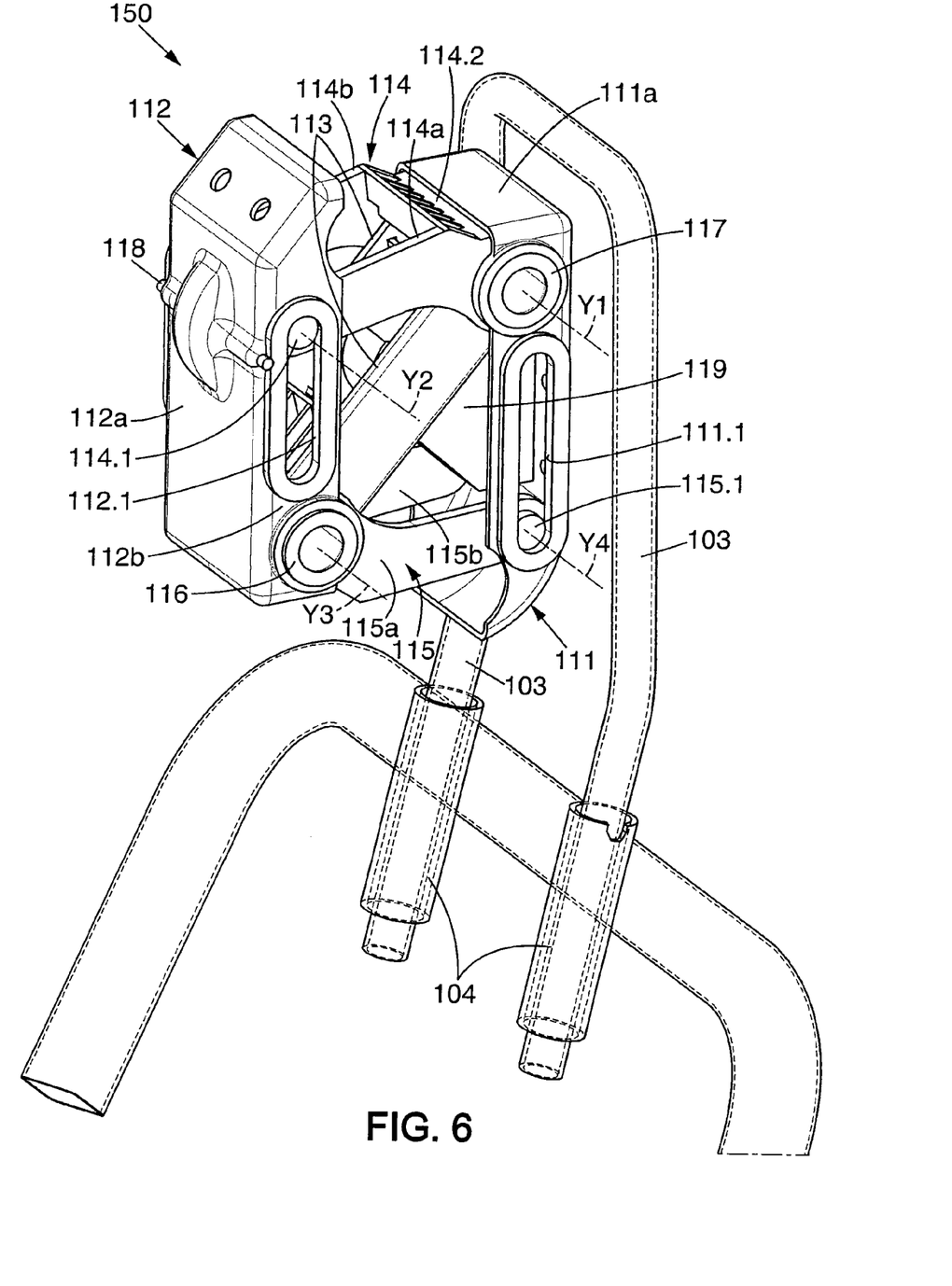
FIG. 6 is a perspective view of the headrest in the protective position.

The two branches 114a, 114b of the first connecting rod 114 are able, for example, to be attached to one another by a material bridge 114c in the region of their first ends (see FIGS. 5 and 6).

The second connecting rod 115 may comprise two parallel symmetrical branches 115a, 115b which each extend in the vicinity of one of the vertical sides of the aforementioned peripheral edges 111b, 112b between:

a first end pivotably mounted about an axis Y3 parallel to Y1 on the lower part of the mobile part 112, by a second pivoting connection 116 such as a shaft passing through the two branches 115a, 115b of the connecting rod 115 and fixed in the two opposing vertical sides of the peripheral edge 112b of the mobile part, and a second end comprising a second pivot 115.1 formed by a pin mounted both pivotably and slidably in a second rectilinear slot 111.1 made in the lower part of the vertical side corresponding to the peripheral edge 111b of the fixed part 111, the second pivot able to turn about an axis Y4 parallel to Y3. The second pivot slides in the slot 111.1 between first and second extreme positions, corresponding respectively to the normal and protective positions of the mobile part 112.

The two branches 115a, 115b of the second connecting rod 115 are able, for example, to be attached to one another by a material bridge 115c in the region of their first ends (see FIGS. 4 and 6).

The third connecting rod 113 is, moreover, pivotably mounted at its two ends on the aforementioned pivoting connections 117, 116. This third connecting rod 113 may advantageously comprise two symmetrical branches, each arranged in the vicinity of one of the branches of the first and second connecting rods 114, 115 and in the vicinity of one of the vertical sides of the peripheral edges 111a, 112a. The two branches of the third connecting rod 113 may be connected to one another by a material bridge in the vicinity of the shaft 116 (see FIG. 4).

First and second resilient devices 121, 122 may be provided respectively on the shafts 116, 117, such as for example helical springs operating in torsion (visible in FIGS. 4 and 5). As regards the shaft 117, one end of the spring 121 bears against the first connecting rod 114, whilst the other end bears against the third connecting rod 113, the spring 121 exerting a torque opening the angle between the two connecting rods 113 and 114. As regards the shaft 116, one end of the spring 122 bears against the second connecting rod 115, whilst the other end bears against the third connecting rod 113, the spring 122 exerting a torque opening the angle between the two connecting rods 113 and 115.

It will be noted that the first and second resilient devices have to be provided on each connecting rod 114, 115 but could be located elsewhere than on the shafts 116, 117, for example in the region of the pivots 114.1, 115.1. The resilient device of each connecting rod could possibly comprise a plurality of springs.

The device which has just been disclosed functions as follows.

When the electromagnet mechanism 119 receives a control signal from the aforementioned external control circuit, for example according to the detection of a rear impact on the vehicle by one or more sensors connected to this control circuit, said electromagnet mechanism releases the hook 120 which, in turn, releases the rod 118.

The third connecting rod 113 then pivots, slightly raising the mobile part 112, whilst the pivots of the first and second connecting rods 114 and 115 suddenly slide in the slots 112.1 and 111.1, under the action of helical springs 121, 122.

Figure 3:
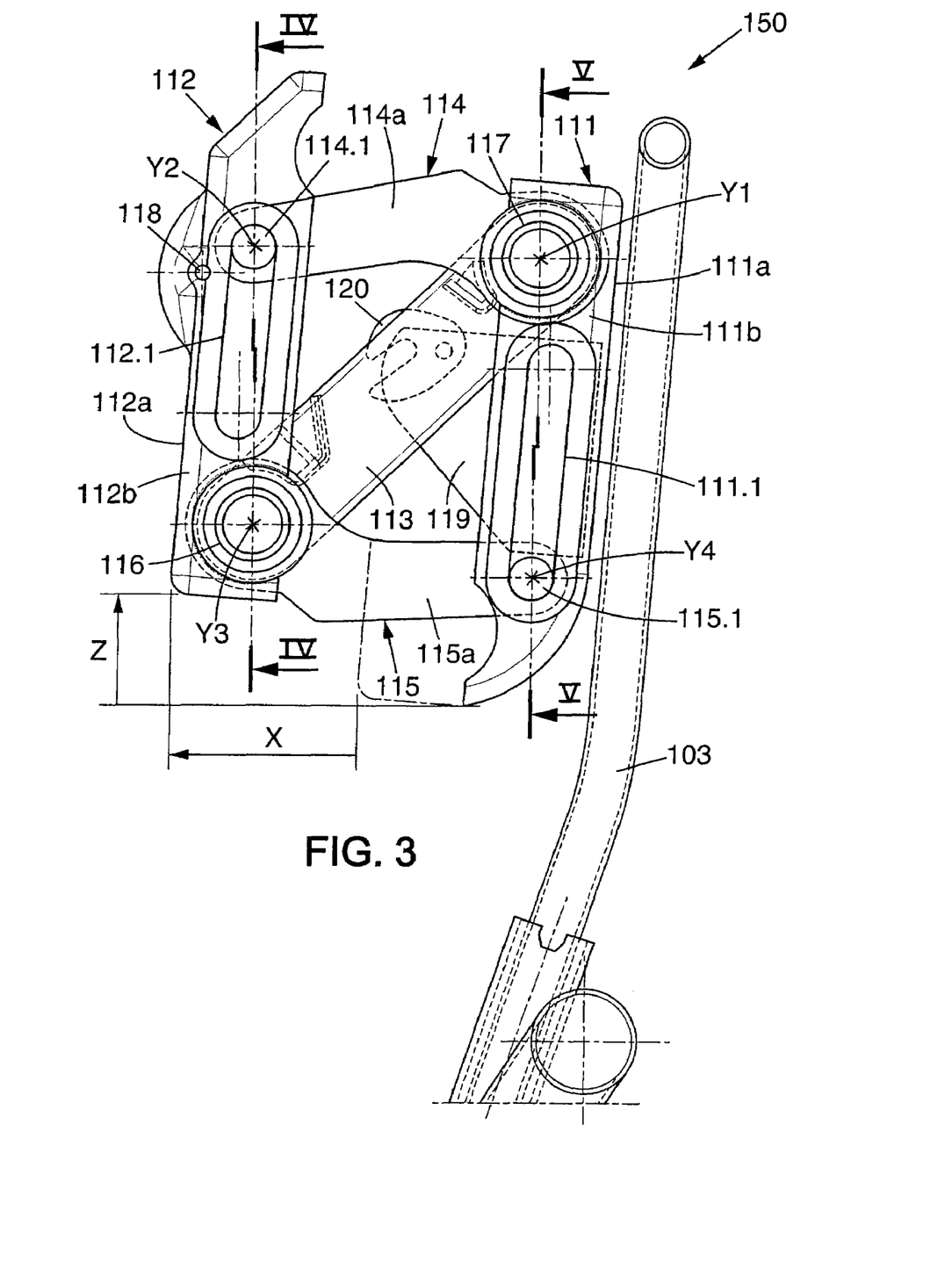
FIG. 3 is a view similar to FIG. 2, showing the headrest in the protective position.

Thus, the mobile part 112, and therefore the front face of the headrest, are displaced towards the head of the user seated on the seat, horizontally towards the front in the longitudinal direction X and vertically upwards in the direction Z (FIG. 3).

In the example considered here, the movement of the connecting rods 114 and 115 is halted when the pivots 114.1 and 115.1 respectively arrive at the end of the slots 112.1 and 111.1, i.e. in abutment in their respective second position.

In the deployed position, or the protective position, as shown in FIGS. 3 and 6, the assembly of the connecting rods and the fixed part and mobile part forms two substantially right-angled triangles with a common side constituted by the third connecting rod 113. The first triangle has the first connecting rod 114, the mobile part 112 and the third connecting rod 113, as sides. The second triangle has the second connecting rod 115, the fixed part 111 and the third connecting rod 113, as sides. The angles 116-114.1-117 and 116-115.1-117 have a value close to 90° or less, due in particular to the length of the slots 111.1 and 112.1, in addition to the first and second connecting rods 114 and 115 of substantially identical length. These two connecting rods are substantially parallel to one another in the protective position. In this position, the mobile part 112 is substantially parallel to the fixed part 111.

The first and second connecting rods, as well as the first and second slots, are thus adapted so that a thrust exerted towards the rear on the mobile part does not allow said mobile part to leave the protective position.

The return of the connecting rods towards the rear, when a force is exerted on the front face of the headrest, is prevented in particular due to the second slot 111.1 which is provided so that:

the second pivot 115.1 is in abutment when it is in its second position, and the second connecting rod 115 passes, between its first and second positions, into an intermediate position where a direction defined by the second pivoting connection 116 and the second pivot 115.1 is substantially perpendicular to the second slot 111.1 as may be seen in FIG. 3.

The same arrangements may be adopted for the first slot 112.1 and the first connecting rod 114.

It will be noted that the respective positions of the pivots 114.1, 115.1 and pivoting connections 116, 117, as well as the manner in which these pivots and connections belong to one or other of the fixed and mobile parts 111, 112, may be modified without departing from the scope of the invention.

Figure 7:
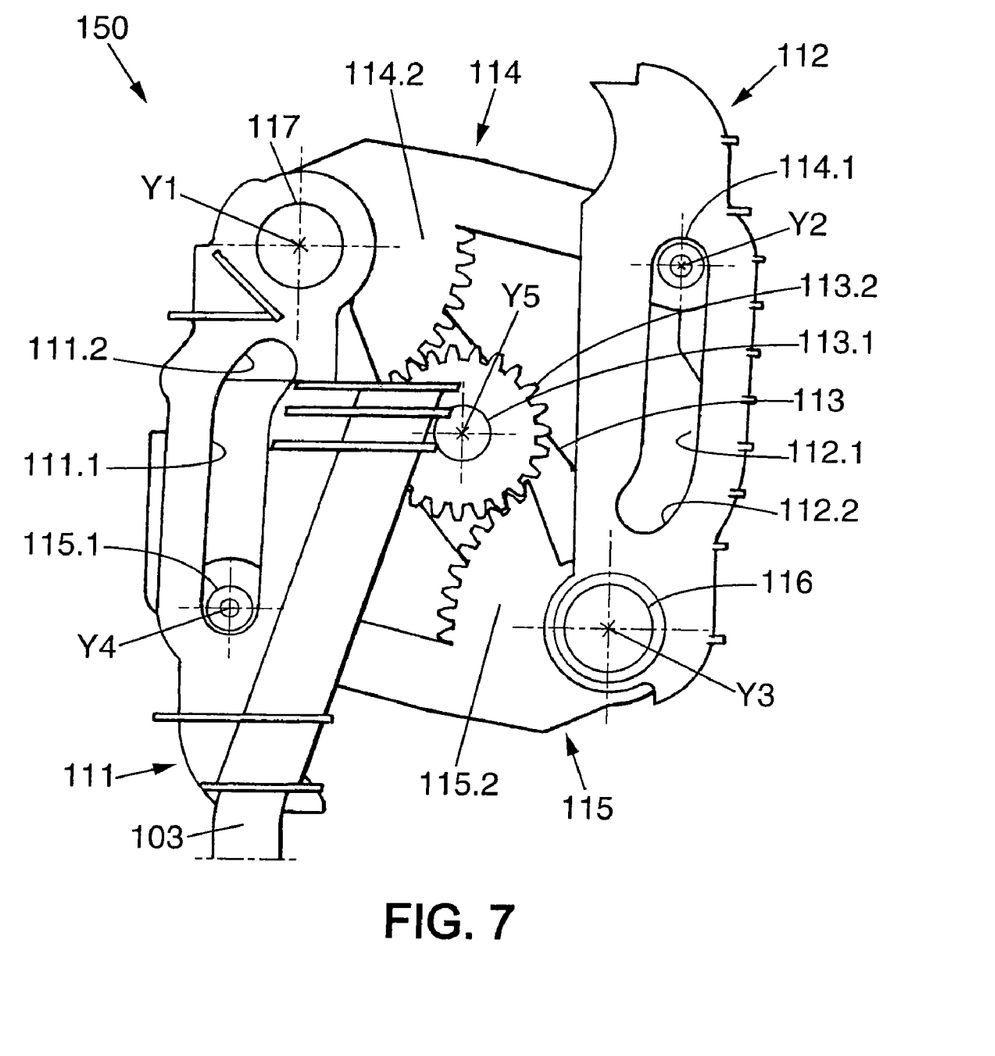
FIG. 7 is a side view according to a second embodiment of the invention.

In FIG. 7 a second embodiment of the invention is shown, repeating elements which are similar to the first embodiment of the invention. Only the elements having essential differences will, therefore, be explained below. The first and second connecting rods 114, 115, moreover, have a toothed section 114.2, 115.2 on each branch in the direction towards one another. The third connecting rod 113 further comprises a pivot axis 113.1 of the axis Y5 parallel to Y1 and Y3, on which is pivotably mounted freely in rotation, on each side of the third connecting rod 113, a toothed pinion 113.2, engaging with the toothed sections of the first connecting rod 114.2 and of the second connecting rod 115.2 on the relevant side. The axis Y5 is located substantially equidistant from the axes Y1 and Y3. Therefore, the movements of the first and the second connecting rod 114, 115 are connected to one another and substantially symmetrical relative to the axis Y5. The angles 116, 117, 114.1 and 117, 116, 115.1 are substantially identical. The mechanism for deploying this embodiment is therefore improved, ensuring a synchronization of the movements of the first and second connecting rods 114, 115 and improved transfer of the energy of the first and second resilient devices 121, 122 towards the connecting rods 113, 114, 115.

Furthermore, in this second embodiment of the invention, the first and second slots 121.1, 111.1 each comprise a first inclined portion 112.2, 111.2 in which the pivots 114.1, 115.1 are housed when the mobile part 112 is in the normal position, and allowing said pivots 114.1, 115.1 to be offset from the normal position and to gain speed when the hook 120 frees the rod 118, such that the actuation of the deployment mechanism is made without the risk of jamming when initiated.

The invention claimed is:

1. Headrest (150) for a motor vehicle, comprising:
a fixed part (111),
a mobile part (112) opposite said fixed part,
at least first and second connecting rods (114,115), each connecting rod comprising at least two branches (114a, 114b, 115a, 115b), connecting said fixed and mobile parts (111,112), said first and second connecting rods allowing the mobile part to be displaced from a normal position in the vicinity of said fixed part, to a protective position remote from said fixed part, the first connecting rod (114) being pivotably mounted, by a first pivoting connection (117), on a first element (111) selected from the fixed and mobile parts (111, 112), and slidably mounted relative to a second element (112) selected from said fixed and mobile parts (111, 112),
and a retaining device designed selectively to maintain the mobile part in the normal position or to release said mobile part,
characterized in that it said headrest further comprises a third connecting rod (113) which connects said first and second elements to one another,
in that the second connecting rod (115) is pivotably mounted on the second element (112) by a second pivoting connection (116) and slidably mounted relative to the first element (111),
and in that it said headrest further comprises first and second resilient devices (121, 122) acting respectively on the first and second connecting rods (115) to urge said mobile part (112) towards the protective position, said first and second resilient devices (121,122) being pretensioned when the mobile part (112) is in the normal position.

2. Headrest according to claim 1, in which the first and third connecting rods (114, 113) are connected to one another by the first pivoting connection (117), the first resilient device comprising at least one first helical spring (121) mounted between said first and third connecting rods (114, 113).

3. Headrest according to claim 2, in which the second and third connecting rods (115, 113) are connected to one another by the second pivoting connection (116), the second resilient device (122) comprising at least one second helical spring mounted between said second and third connecting rods (115, 113).

4. Headrest according to claim 3, in which each of the first and second elements has an upper part and a lower part, the first pivoting connection (117) being provided in the upper part of the first element (111) and the second pivoting connection (116) being provided in the lower part of the second element (112).

5. Headrest according to claim 1, in which the first and second connecting rods (114,115) comprise toothed sections (114.2, 115.2); the third connecting rod (113) carries at least one toothed pinion (113.2) engaging with said toothed sections (114.2, 115.2).

6. Headrest according to claim 5, in which the toothed pinion (113.2) is freely rotatably mounted on a central part of the third connecting rod (113).

7. Headrest according to claim 1 in which the first connecting rod (114) comprises a first pivot (114.1) slidable in a first slot (112.1) provided on said second element (112), between a first position corresponding to the normal position of said mobile part, and a second position corresponding to the protective position.

8. Headrest according to claim 7, in which the second connecting rod (115) comprises a second pivot (115.1) slidable in a second slot (111.1) provided on the first element (111), between a first position corresponding to the normal position of said mobile part, and a second position corresponding to the protective position.

9. Headrest according to claim 8, in which the first and second connecting rods (114, 115), as well as the first and second slots (112.1, 111.1), are designed so that a thrust exerted on the mobile part (112) does not allow said mobile part to leave the protective position.

10. Headrest according to claim 8, in which at least the second slot (111.1) is provided so that the second pivot (115.1) is in abutment when the second connecting rod (115) is in the second position, and so that the second connecting rod passes, between its first and second positions, into an intermediate position where a direction defined by the second pivoting connection (116) and the second pivot (115.1) is substantially perpendicular to the second slot (111.1).

11. Headrest according to claim 10, in which the second slot (111.1) has a substantially rectilinear shape.

12. Headrest according to claim 8, in which the first slot (112.1) comprises a first portion in which the first pivot (114.1) is located when it is in the first position and a second portion in which the first pivot (114.1) is located when it is in the second position; the second slot (111.1) comprises a first portion, in which the second pivot (115.1) is located when it is in the first position, and a second portion in which the second pivot is located (115.1) when it is in the second position, the second portion of each of the first and second slots (112.1,111.1) extending in a different direction from the first portion of the same slot, said portion being arranged to facilitate a displacement of the mobile part (112) from the normal position towards the protective position.

13. Headrest according to the claim 12, in which the second portion of each of the first and second slots (112.1, 111.1) is substantially rectilinear and the first portion of the same slot is inclined relative to said second portion towards the other slot.

14. Headrest according to claim 13, in which the first portion of each of the first and second slots (112.1, 111.1) is curved inwards.

15. Headrest according to claim 1, in which the first element is the fixed part (111) and the second element is the mobile part (112).

16. Vehicle seat comprising a backrest (101 carrying at least one headrest (150) according to claim 1.

* * * * *